United States Patent [19]
Dougherty et al.

[11] Patent Number: 6,134,314
[45] Date of Patent: Oct. 17, 2000

[54] METHOD AND SYSTEM FOR DYNAMICALLY REDIRECTING WIRELINE CALL DELIVERY

[75] Inventors: Angus O. Dougherty, Westminster, Colo.; Jerry O. Webb, East Moline, Ill.

[73] Assignee: Qwest Communications International Inc., Denver, Colo.

[21] Appl. No.: 09/210,521

[22] Filed: Dec. 11, 1998

[51] Int. Cl.[7] ............................................. H04M 3/42
[52] U.S. Cl. ........................ 379/207; 379/211; 455/461; 455/433
[58] Field of Search .................. 379/207, 211, 379/212; 455/461, 432, 433, 445

[56] References Cited

U.S. PATENT DOCUMENTS 5,901,359  5/1999  Malmstrom ............................ 455/461
5,920,820  7/1999  Qureshi et al. ....................... 455/461

*Primary Examiner*—Creighton Smith
*Attorney, Agent, or Firm*—Brooks & Kushman

[57] ABSTRACT

A method and system are provided which allow a wireline network to dynamically control call redirection at a wireline Service Control Point (SCP) for mobile subscribers. A wireless location register routinely updates the wireline SCP with information indicative of the operational status of a mobile termination unit. The SCP is arranged to maintain the mobile unit status in a resident database. When a call is placed to a subscriber's home telephone number, an SSP will query the SCP for routing instructions, and in response, the SCP will merely access its maintained database to determine the status of the mobile unit. The SCP either sends a mobile identification number or equivalent address to the SSP if the mobile is available, or the home telephone number if the mobile is unavailable.

9 Claims, 3 Drawing Sheets

METHOD AND SYSTEM FOR DYNAMICALLY REDIRECTING WIRELINE CALL DELIVERY

TECHNICAL FIELD

The present invention generally relates to a method and system for extending wireline terminal unit voice and data service access (embedded within the wireline network system) to mobile terminal units using radio access technologies (i.e., Cellular, PCS, MMDS), and more specifically to dynamically redirecting wireline call delivery to mobile terminal units.

BACKGROUND ART

Generally, wireline and wireless mobile communication systems operate as separate network entities, with wireline and wireless terminal units being addressed by unique directory numbers that are specific to one system or the other. In this configuration, call delivery between systems is performed through static call redirection databases and manual forwarding techniques that are specific to translations, routing and service databases of each particular communication system.

Known systems and call forwarding techniques currently provide a customer with the ability to manually redirect wireline call terminations from their wireline terminal unit directory number to an associated mobile terminal unit. In addition, known systems arrange for the wireline network to query a wireless service provider for availability of an associated mobile terminal unit before redirecting the incoming call to an assigned wireless terminal unit.

In other words, when a call is made to a subscriber's home of office telephone number, the call is delivered by a public switched telephone network (PSTN) to a switch assigned to serve the subscriber's home or office. Upon receipt of the call from the PSTN, the serving switch will execute an AIN Terminating Access Attempt Trigger (TAT) to query an appropriate Service Control Point (SCP) database to obtain special routing instructions. Information contained within the SCP database is used by the wireline switching system to route the call to the subscriber's mobile terminal unit.

In response to this query, the SCP database will then query the associated mobile service provider terminal location register (Home or Visitor Location Register HLR/VLR) by using industry standard IS-41 Location Request messaging. Upon request, the mobile switching system will poll the mobile terminal unit to determine the activity and location of the mobile terminal unit. Once determined, the mobile system replies to the SCP database query with a Location_Request return signal to report the mobile terminal unit's status. If the mobile unit is available, the mobile system returns the mobile's identification number to the SCP for call delivery routing to the identified mobile terminal unit. If the mobile system replies to the SCP database query indicating that the mobile terminal unit is unavailable, the wireline switching system will direct the terminating call delivery to the subscriber's wireline terminal unit.

While both known systems have been successful in providing call redirection of terminating wireline call delivery to the mobile terminal unit, the results have been less than satisfactory. Inefficiencies in these call delivery techniques have resulted in subscriber confusion, latent call delivery rates and limited mobile terminal portability outside the wireline and mobile home service area. Therefore, a need exits for a system and method for dynamically instructing the wireline system to redirect calls to the mobile terminal unit independent of the presence of an incoming call termination to the wireline terminal unit.

DISCLOSURE OF INVENTION

It is therefore an object of the present invention to provide a method and system which dynamically instructing a wireline network system to redirect wireline call delivery activities to a mobile terminal unit prior to an incoming call termination event, thereby limiting the need of an SCP database within the wireline network system to send out queries and add delay to both wireline and mobile wireless call delivery.

It is another object of the present invention to provide a method and system for using autonomous registration, de-registration and location reporting methods by a mobile terminal unit to provide information needed to dynamically redirect call delivery instructions to a wireline SCP database independently of incoming call delivery requests from a PSTN.

In accordance with these and other objects, the present invention provides a method and system for selectively redirecting call traffic originating from a wireline communication system to a mobile transceiver unit associated with a wireline termination unit which monitors the status of the mobile transceiver unit at a wireless switching center to determine availability to receive call traffic, and automatically sends data representative of the status of the mobile transceiver unit to a wireline service control point for updating of a service control point routing database. The present invention is arranged to receive a request for call routing information from the wireline system at the service control point, and in response, access the database to determine the current status of the mobile transceiver unit.

Based on the information stored in the wireline service control point database, the service control point provides either routing information to route the call to the mobile transceiver unit, or routing information to route the call to an associated wireline termination unit if the mobile unit is unavailable to receive call traffic. In a preferred embodiment, the status data is continually or routinely updated at the service control point in response to the wireline network updating changes in registration status for the mobile transceiver unit.

In accordance with the present invention, one or more location registers within the mobile network system provide call delivery redirection instructions to the SCP database using IS-41. Unlike previous techniques that rely upon the wireline network systems to request information from the mobile network system before applying redirection instruction, the present invention provides a proactive technique that allows the mobile network system to request application of redirection instructions using Registration_Notification or Route_Request messaging. Thus, a higher call delivery rate is achieved at minimal expense, thereby making wireless extension services seamless to a subscriber when in and out of their designated service area. In addition, the redirection properties of the present invention are independent of a wireless terminal unit's geographical location. By providing dynamic redirection, the present invention provides call delivery redirection instructions which are autonomous and not statically dictated by predetermined provisioning processes.

The above objects and other objects, features, and advantages of the present invention are readily apparent from the following detailed description of the best mode for carrying out the invention when taken in connection with the accompanying drawings wherein like reference numerals correspond to like components.

BEST MODE FOR CARRYING OUT THE INVENTION

Figure 1:
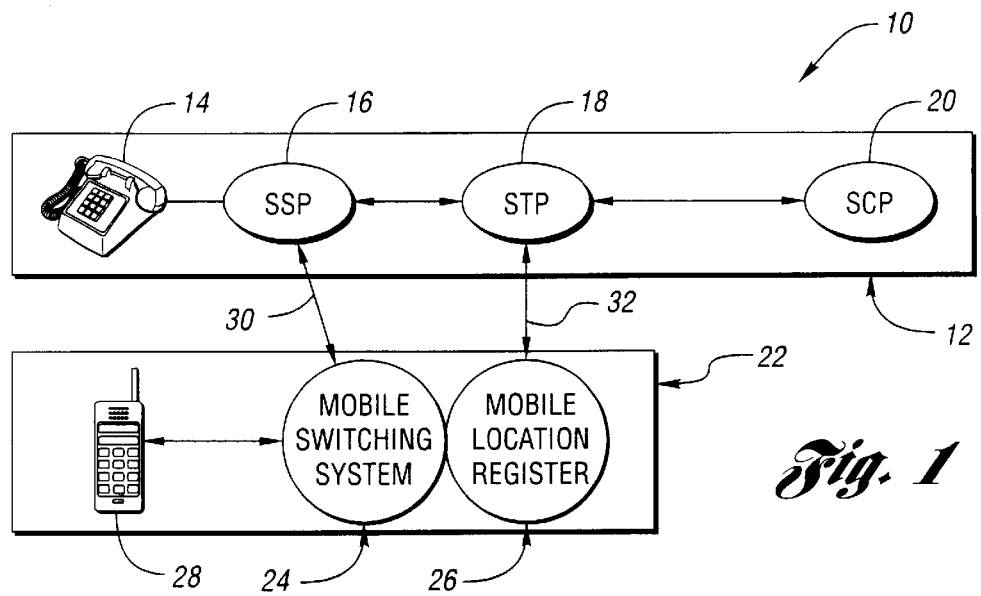
FIG. 1 is a block diagram of the interrelationship between the wireline and mobile networks in accordance with the present invention.

FIG. 1 provides a block diagram of a communication system 10 in accordance with the present invention having at least one separate but linked wireline network 12 and mobile network 22. In particular, FIG. 1 illustrates the interrelationship or linking of the wireline and mobile networks.

Wireline network 12 is formed from a plurality of network elements. As shown, these network elements include wireline switching systems 16, Signaling Transfer Points (STPs) 18, and Service Control Point (SCP) databases 20. Wireline switching systems 16 are used to perform call processing on calls that originate, tandem or terminate at assigned sites. STPs 18 are used to facilitate call and feature control signal routing between wireline switching systems 16 and external SCP databases 20, as well as a plurality of wireline terminal units 14. Common Channel Signaling System No.7 (SS7) is employed in the wireline network to support communication of signaling information relating to call setup, control, management and maintenance and Inter-network system signaling between the line and mobile network systems 10.

Mobile network 22 includes a mobile switching system 24 (which is optional), a wireless location register (a Home Location Register/Visitor Location Register (VLR/HLR)) 26 and a plurality of mobile terminal units 28. The functions performed by wireless location register 26 may be carried out either within the mobile switching system (particularly if such an element is employed in the wireless network), or external thereto. Together, both mobile switching system 24 and wireless location register 26 are responsible for management and processing of calls to and from mobile terminal units 28. Except as described below, the basic operations of all the above components are generally known to one skilled in the art. In general, mobile switching system 24 operates as a digital telephone exchange and controls call delivery within mobile network 22 for mobile-to-mobile calls, as well as between the mobile network and wireline network 12 for wireline-to-mobile and mobile-to-wireline calls. An inter-system voice trunk 30 and signaling link 32 are used between wireline network system 12 and mobile system 24 to facilitate call delivery.

Generally, wireless components can communicate using IS-41 Mobile Application Part (MAP) protocols operating over SS7 networks. IS-41 data trunks are packet switched networks, having either X.25 or SS7 type transport options.

In operation, when mobile switching system 24 receives a call from the wireline network which is directed to a wireless unit 28, mobile switching system 24 deciphers the telephone number and alerts appropriate Base Station Controllers (not shown) to page the corresponding wireless unit 28. Similarly, when wireless unit 28 places a call, mobile switching system 24 accepts the dialing data from the BSC and dials the desired number for transmission to wireline network 12. Mobile switching system 24 also processes mobile registration status data received from a BSC, switches calls to other cells, processes diagnostic information, and compiles mobile billing statistics.

The wireless location register operates as master database for storing data related to each mobile subscriber, such as subscriber profile and mobility information together with relevant permanent data, such as access capabilities and subscriber services. In addition, the wireless location register provides mobile switching system 24 with information regarding the location and status of a mobile termination unit to allow incoming calls to be routed immediately thereto. In addition, an Access Manager (AM) (not shown) can be employed to manage mobility within the wireless network. For example, an AM, along with a BSC, HLR, and VLR, operates to support basic wireless network operations such as registration, authentication, and call hand off between base stations.

Figure 2:
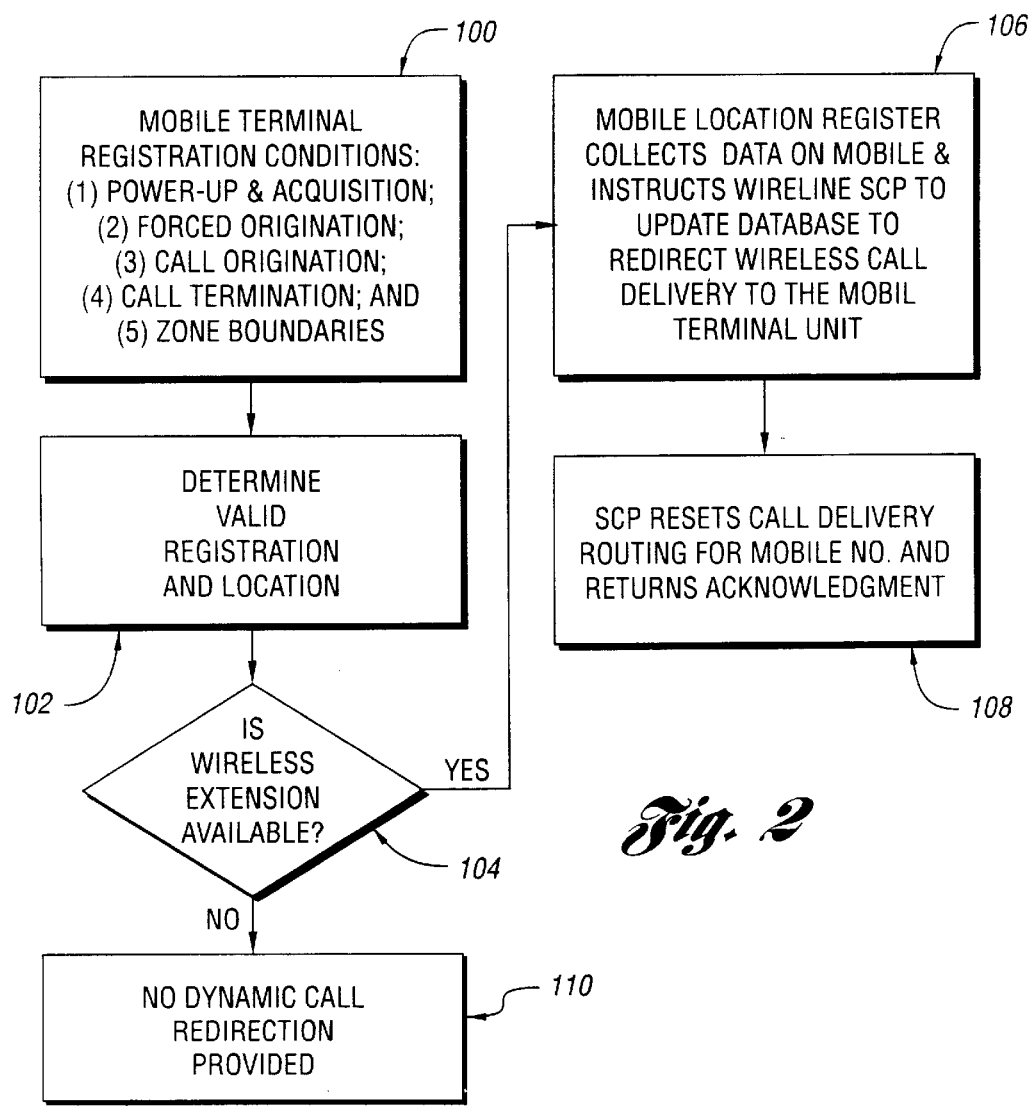
FIG. 2 is a flowchart illustrating the registration process for dynamic call redirection in accordance with the present invention.
Figure 3:
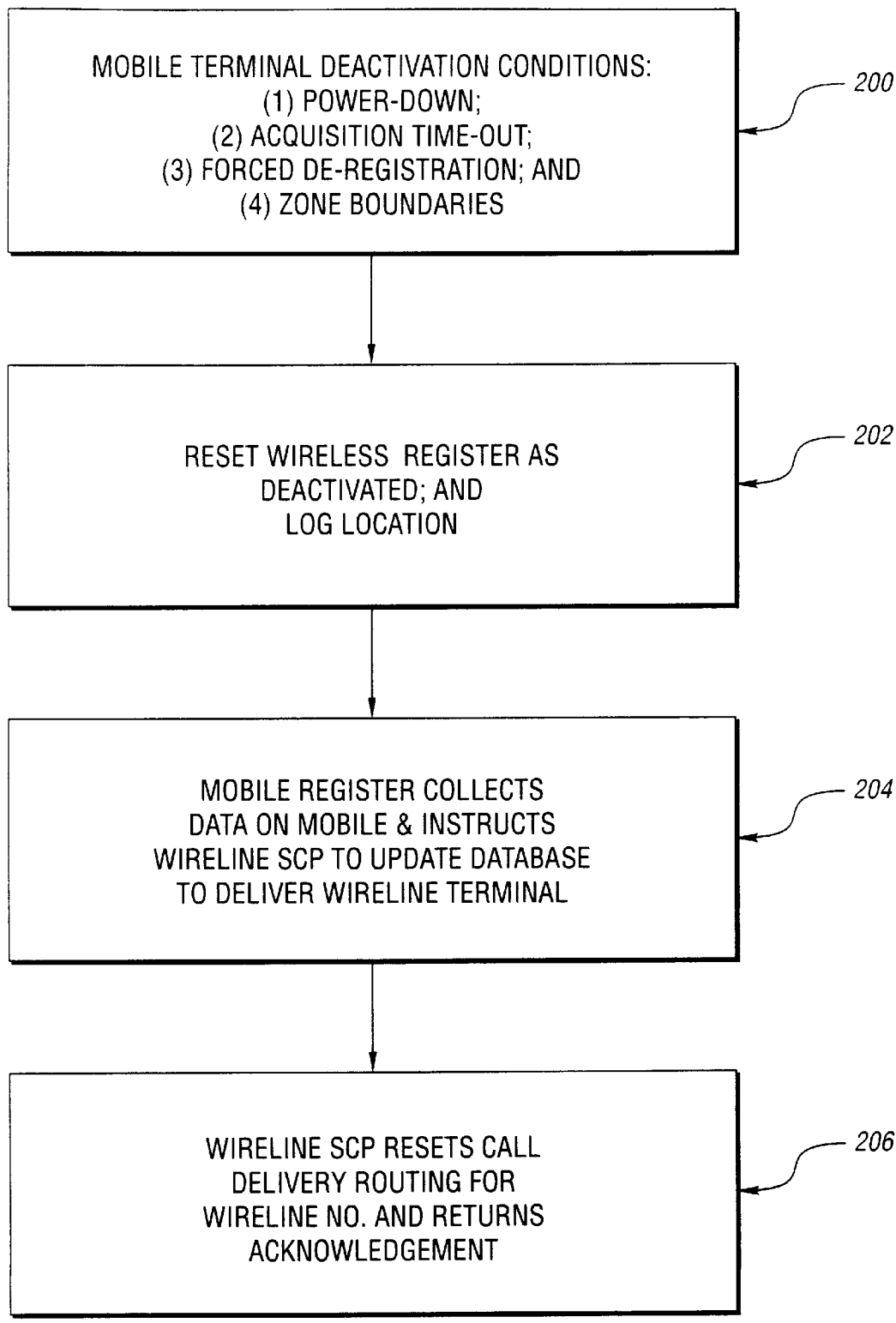
FIG. 3 is a flowchart illustrating the de-registration process for dynamic call redirection in accordance with the present invention.
Figure 4:
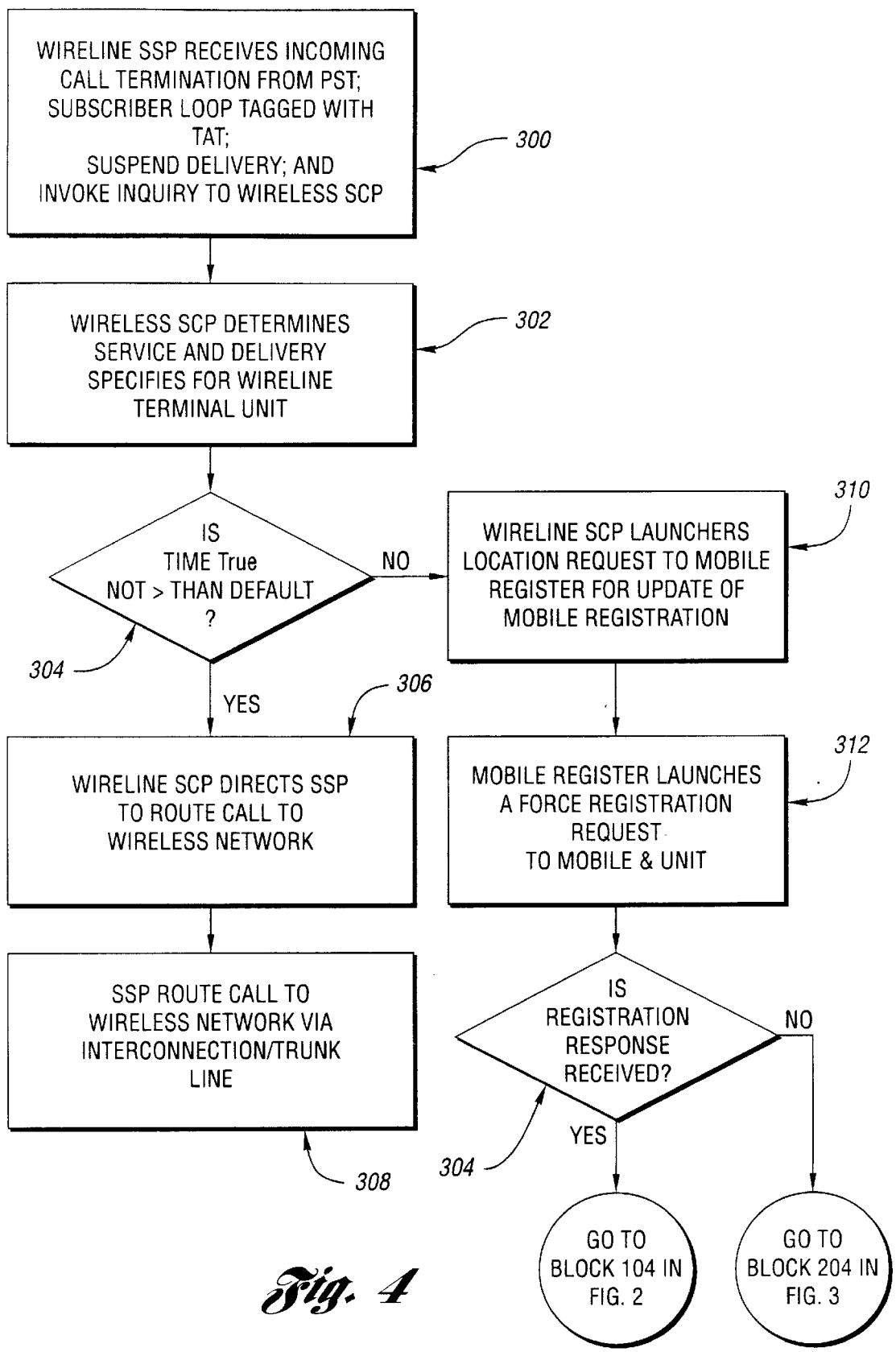
FIG. 4 is a flowchart illustrating dynamic call redirection in accordance with the present invention.

Referring now to FIGS. 2–4, a series of flowcharts are provided that illustrate the dynamic call redirection process of the present invention. More specifically, FIG. 2 summarizes wireless unit registration in accordance with the present invention. As denoted at block 100, registration of a mobile unit 28 can occur with one or more of the following events: (1) activation on power-up and acquisition of carrier frequency; (2) system initiated forced registration of an active mobile unit; (3) registration on call origination; (4) registration on incoming call termination; (5) crossing of a geographically zoned boundary; and (6) carrier reacquisition registration for faded signal condition. Under all of these conditions, mobile location register 26 validates the mobile unit and registers activation status and the unit's location at block 102.

As denoted at block 104, if mobile location register 26 determines that mobile unit 28 is registered as an extension of a wireline terminal unit 14 and is within its home service area, the location register notifies wireline SCP database 20 at block 106 with a message reporting the active state and a directory number for redirecting any incoming terminating calls. The directory number can represent the mobile unit's actual identification number when the mobile unit is in its home service area, or a temporary routing directory number that identifies a serving network for which the mobile terminal has been registered as a roamer outside its home service area. The wireline SCP database then returns an acknowledgment of change request to mobile location register 26 as denoted at block 108. Otherwise, the system notes that no dynamic call redirection is provided as indicated at block 110.

FIG. 3 illustrates de-registration of a mobile unit in accordance with the present invention. As indicated at block 200, de-registration can occur with one of the following events: (1) powering down of a mobile unit 28; (2) acquisition time-out when a carrier is lost; (3) system initiated forced de-registration of an active mobile unit; and (4) crossing of geographically zoned boundaries. Under each condition, the mobile location register resets the mobile activation status as deactivated and logs the last known location at block 202. At block 204, when mobile location register 26 determines that the mobile unit 28 is de-registered, the mobile register forwards a de-registration indication and a null directory number to wireline SCP database 20. In response, the SCP database resets the mobile redirection indicator to exercise direct call delivery to the wireline terminal unit at block 206.

FIG. 4 illustrates dynamic call delivery in accordance with the present invention. As indicated at block 300, when a call is received from a PSTN for call delivery to a mobile extension subscriber's wireline number, the subscriber loop is tagged with a TAT and call delivery is momentarily suspended while wireline SSP 16 initiates a query message to wireline SCP database 20 to determine specific service features associated with the subscriber for handling delivery of the call. In response to the query message, SCP database 20 determines the current status of its mobile activity register as denoted at block 302. If a subscriber's active registration interval timer is within a time $T_{ms}$ as determined at block 304, i.e., $T_{ms}$ is not greater than a default value, SCP database 20 replies to the SSP query at block 306 with an instruction to redirect the wireline call delivery to the mobile directory number received from the wireline network at the time the mobile unit registered. The SSP then forwards the incoming call termination to the mobile network system at block 308 via inter-system trunk 30 and signaling link(s) 32. In addition, if the calling line identification of the incoming call termination at the SSP is noted by the SCP to be equal to the wireless terminal identification, the SCP will instruct the SSP to deliver the incoming call to the associated wireline terminal unit. This provision allows a subscriber to use the wireless terminal unit to call their wireline terminal unit without otherwise initiating call redirection.

Referring again to block 304, if the subscribers active registration interval timer $T_{ms}$ has expired, i.e., $T_{ms}$ is greater than the default value, the SCP launches an activity status query to mobile location register 26 of wireless network 22 as denoted at block 310. If a mobile switching system 24 is employed in network 22, the mobile location register requests the mobile switching system to force registration of the mobile terminal unit 29 at block 312 to determine activity status of the mobile. As denoted at block 314, if the mobile terminal unit replies within a predetermined mobile registration interval, the location register will reply according to block 104 of the registration process in FIG. 2. If the SCP is provided with a routing directory number, the call will be delivered according to the call delivery process at block 306.

The present invention does not require the SCP to send a Location-Request message to a mobile switching center 24 for every call attempt. Instead, mobile location register monitors for changes in the mobile unit status and autonomously informs the SCP when a call query is received. In one embodiment, mobile switching center 24 (if used in network 22) sends an IS41 Registration-Notification to the SCP when a mobile unit is available to receive a call, and an IS41 MS Inactive when a mobile unit is unable to receive a call. The SCP is arranged to continuously maintain the status of the handset in a database. Thus, when a call is placed to a subscriber's home telephone number, the SCP merely accesses its maintained database to determine the status of the mobile unit to control whether the call is routed to the mobile unit or the wireline unit.

In addition, mobile switching system 24 and SCP 20 can be arranged to be capable of simultaneously supporting dynamic call redirection in accordance with the present invention, as well as IS41 Location_Request implementations as described above in connection with known systems.

Thus, dynamic redirection of wireline call delivery in accordance with the present invention provides a higher rate of call completion to the wireless and wireline terminal units when the wireless terminal is outside of its home service area or in a transitional registration state.

While the best mode for carrying out the invention has been described in detail, those familiar with the art to which this invention relates will recognize various alternative designs and embodiments for practicing the invention as defined by the following claims.

What is claimed is:

1. In a communication system having a wireline network linked to a wireless network, a system for selectively directing call traffic originating from the wireline network to a mobile transceiver unit in the wireless network comprising:

a wireless unit location register for maintaining a first database containing information indicative of mobile transceiver unit registration status and location; and a wireline service control point in communication with the wireless unit location register for maintaining a second database of data indicative of the availability status of the mobile transceiver unit, wherein the wireless unit location register is arranged to send data representative of the status of the mobile transceiver unit including a directory number to the wireline service control point for updating of the second database, wherein the service control point is arranged to access the second database directly when a request for call routing information is received from the wireline system, and providing information either for routing the call to the mobile transceiver unit based on the directory number maintained in the second database if the mobile unit is available to receive call traffic, or a designated wireline termination unit if the mobile unit is unavailable to receive call traffic.

2. In a communication system having a wireline network linked to a wireless network, a system for selectively directing call traffic originating from the wireline network to a mobile transceiver unit in the wireless network comprising:

a wireless unit location register for maintaining a first database containing information indicative of mobile transceiver unit registration status and location; and a wireline service control point in communication with the wireless unit location register for maintaining a second database of data indicative of the availability status of the mobile transceiver unit, wherein the wireless unit location register is arranged to send data representative of the status of the mobile transceiver unit to the wireline service control point for updating of the second database, wherein the service control point is arranged to access the second database directly when a request for call routing information is received from the wireline system, and providing information either for routing the call to the mobile transceiver unit if the mobile unit is available to receive call traffic, or a designated wireline termination unit if the mobile unit is unavailable to receive call traffic, wherein the service control point is further arranged to determine whether an activity status timer associated with an available mobile unit has exceeded a predetermined value, and providing the information for routing the call to the mobile transceiver unit if the predetermined value is not exceeded.

3. The system of claim 2 wherein the service control point is further arranged to request the wireless network to initiate a forced registration process if the activity status timer has exceeded the predetermined value.

4. The system of claim 3 wherein the service control point waits for a mobile unit de-registration signal from the wireless network in response to the forced registration process before providing the information for routing the call to the designated wireline termination unit.

5. A method for selectively directing call traffic originating from a wireline network to a mobile transceiver unit in a wireless network comprising:

maintaining a first database in the wireless network containing information indicative of mobile transceiver unit registration status and system location;

maintaining a second database in a wireline network service control point (SCP) of data indicative of the availability status of the mobile transceiver unit;

sending data representative of the status of the mobile transceiver unit including a directory number from the wireless network to the wireline service control point for updating of the second database;

in response to the wireline SCP receiving a request for call routing instructions for routing a call, accessing the second database; and providing information either for routing the call to the mobile transceiver unit based on the directory number maintained in the second database if the mobile unit is available to receive call traffic, or a designated wireline termination unit if the mobile unit is unavailable to receive call traffic.

6. The method of claim 5 further comprising automatically sending the status data for updating the second database every time a mobile transceiver unit is registered or de-registered in the wireless network.

7. A method for selectively directing call traffic originating from a wireline network to a mobile transceiver unit in a wireless network comprising:

maintaining a first database in the wireless network containing information indicative of mobile transceiver unit registration status and system location;

maintaining a second database in a wireline network service control point (SCP) of data indicative of the availability status of the mobile transceiver unit;

sending data representative of the status of the mobile transceiver unit from the wireless network to the wireline service control point for updating of the second database;

in response to the wireline SCP receiving a request for call routing instructions for routing a call, accessing the second database;

determining whether an activity status timer associated with an available mobile unit has exceeded a predetermined value, and providing information either for routing the call to the mobile transceiver unit if the predetermined value is not exceeded and the mobile unit is available to receive call traffic, or a designated wireline termination unit if the mobile unit is unavailable to receive call traffic.

8. The method of claim 7 further comprising requesting the wireless network to initiate a forced registration process if the activity status timer has exceeded the predetermined value.

9. The method of claim 8 further comprising waiting for a mobile unit de-registration signal from the wireless network in response to the forced registration process before providing the information for routing the call to the designated wireline termination unit.

* * * * *